United States Patent [19]

Walton, II

[11] 4,238,884
[45] Dec. 16, 1980

[54] ORBITAL JIG SAW

[75] Inventor: Richard E. Walton, II, Fallston, Md.

[73] Assignee: Black & Decker Inc., Newark, Del.

[21] Appl. No.: 50,043

[22] Filed: Jun. 19, 1979

[51] Int. Cl.³ .................. B23D 49/00; B27B 11/00
[52] U.S. Cl. ............................. 30/393; 83/776
[58] Field of Search .................. 30/392, 393, 394; 83/758, 759, 776

[56] References Cited
U.S. PATENT DOCUMENTS

| 2,775,272 | 12/1956 | Papworth | 30/393 |
| 2,917,088 | 12/1959 | Papworth | 30/393 |
| 3,374,814 | 3/1968 | Kaufmann | 83/758 |
| 3,890,708 | 6/1975 | Bauer | 30/392 |
| 4,137,632 | 2/1979 | Pfanzer | 30/393 |

FOREIGN PATENT DOCUMENTS

| 2303532 | 8/1974 | Fed. Rep. of Germany. | |
| 2650470 | 5/1978 | Fed. Rep. of Germany | 30/394 |

Primary Examiner—Jimmy C. Peters
Attorney, Agent, or Firm—Leonard Bloom; Edward D. Murphy; Harold Weinstein

[57] ABSTRACT

A portable electric orbital jig saw of the adjustable orbit type incorporating an improved manually adjustable orbit drive mechanism which transmits smooth, continuous orbital motion to a reciprocating saw blade with no lost motion, from a full orbit mode operation to a zero orbit mode operation in which the saw blade reciprocates along a straight line. The present orbital drive mechanism includes levers operatively connected to one another in all operative positions thereof, but adjustable to vary the mechanical advantage thereof to thereby vary the degree of orbital motion of the saw blade.

25 Claims, 13 Drawing Figures

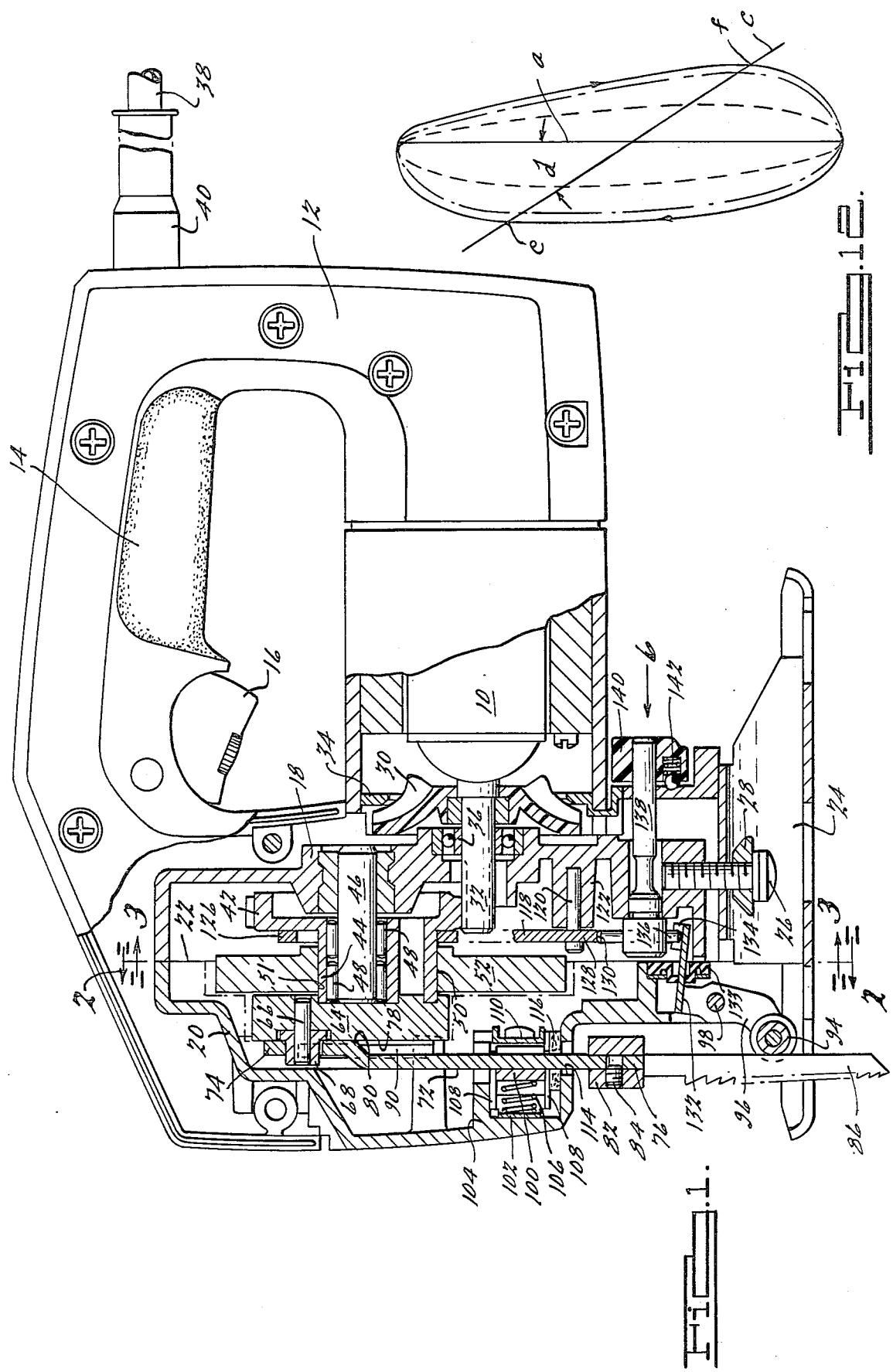

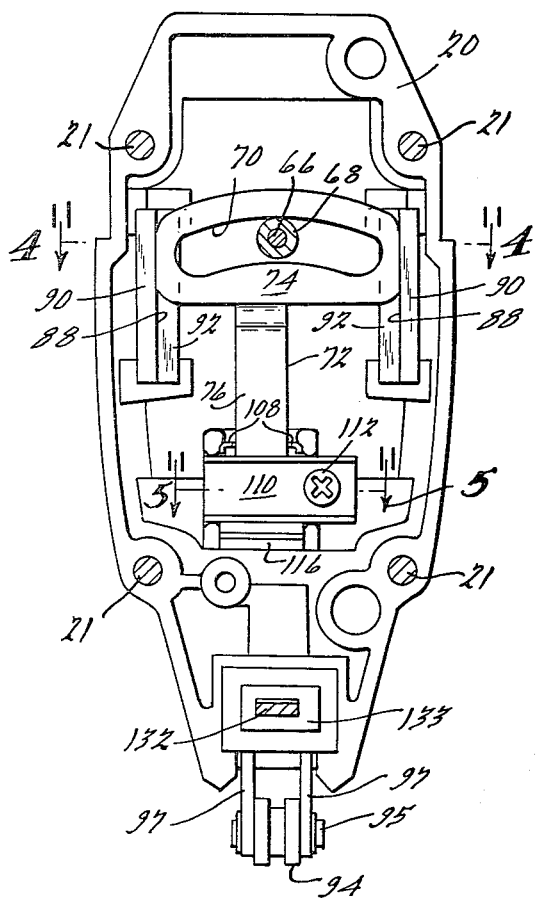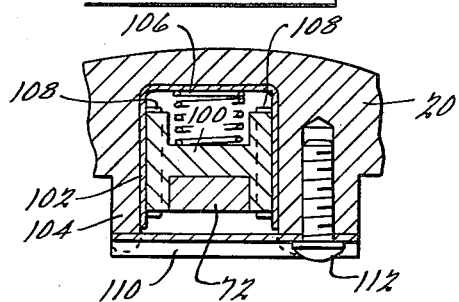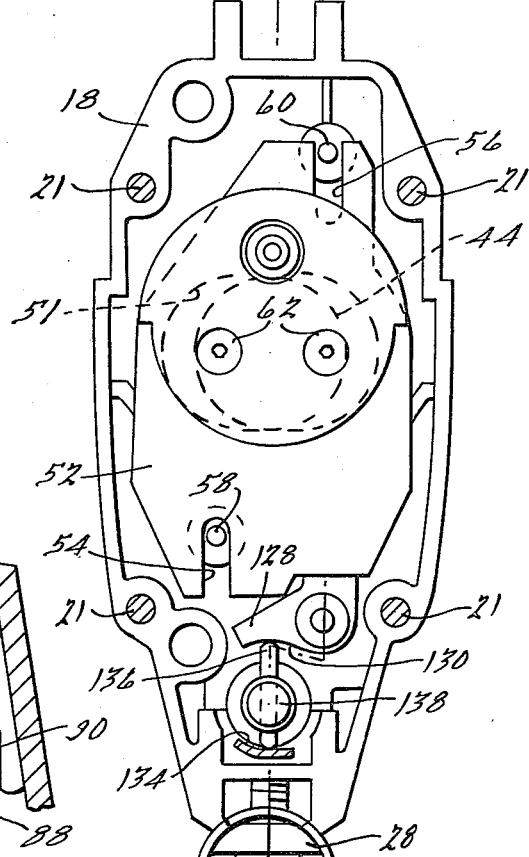

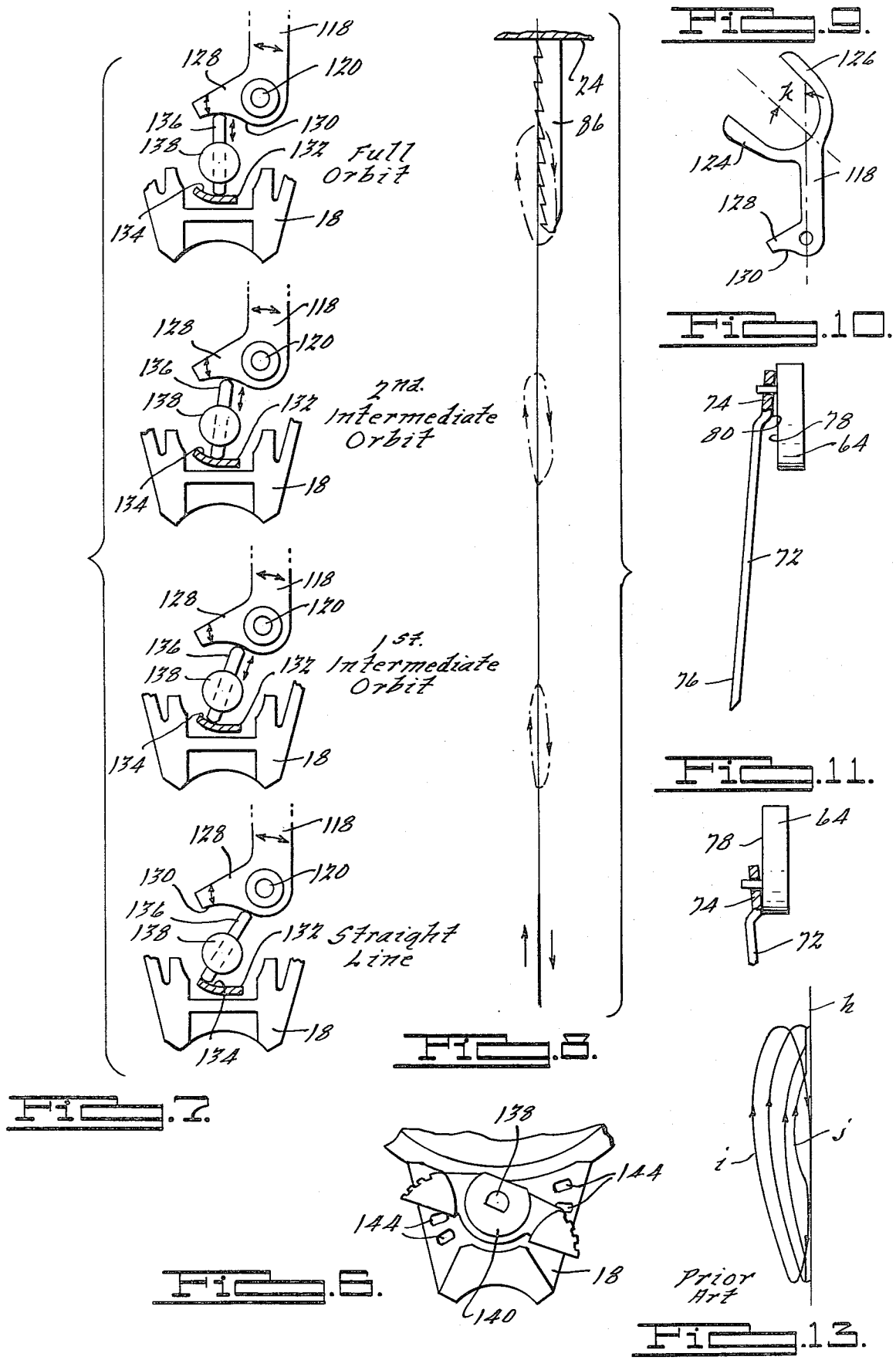

ORBITAL JIG SAW

BACKGROUND AND SUMMARY OF THE INVENTION

This invention relates to jig saws, and more particularly to portable electric jig saws of the type sometimes referred to as saber saws or bayonet saws.

It has been recognized that significant improvements in the performance of jig saws of the present type can be achieved in many situations by providing a path of movement to the saw blade which is orbital in the vertical plane of the feed direction, rather than merely reciprocal along a straight line. However, under certain conditions, and for the sawing of certain materials, better results can still be obtained with straight line cutting. Consequently, jig saws have been developed which are capable of both types of operation, and which have manually adjustable means for varying the degree of orbital movement (i.e., the amount of displacement of the saw blade in the feed direction during each cycle thereof). In most of these known mechanisms blade displacement in the feed direction is accomplished by a guide roller which engages the trailing edge of the blade as it reciprocates vertically, means being provided to oscillate the guide roller back and forth in the feed direction on each cycle of the blade.

Most known mechanisms for achieving adjustable orbital blade movements have a significant drawback in that they reduce the degree of orbital blade movement merely by mechanically interrupting movement of the guide roller. This results in substantial lost motion in the orbital drive train, and attendant slapping of the parts, when the mechanism is set for less than full orbital action. The abrupt motion is noisy, causes the saw teeth to impact the workpiece and can result in tooth damage in high loading conditions, and increases wear and vibration.

Another disadvantage of these "lost motion" mechanisms is that the path of the saw blade is not a true orbital path when set for less than full orbital action. As a consequence, not all of the saw teeth are used in each cycle, reducing sawing efficiency.

It is a primary object of the present invention to provide an improved orbital jig saw which may be easily manually adjusted from full orbital action to a straight line action and which overcomes the aforementioned disadvantages of known mechanisms. The mechanism of the present invention provides infinite adjustment of the orbital path while at all times maintaining a smooth uninterrupted true orbital sawing action with no lost motion, thereby reducing tooth impact, wear, noise, vibration and the like, while maximizing the use of all saw teeth to improve sawing efficiency.

Further objects of the invention reside in the provision of a portable orbital jig saw ideally suited for heavy-duty professional use, yet which is relatively compact in size and relatively light in weight.

These and other objects, features and advantages of the present invention will become apparent from the subsequent description and the appended claims, taken in conjunction with the accompanying drawings.

BRIEF DESCRIPTION OF THE DRAWINGS

FIG. 1 is a side elevational view, partly in longitudinal section, illustrating an orbital jig saw embodying the principles of the present invention;

FIG. 2 is a transverse sectional view taken along line 2—2 in FIG. 1;

FIG. 3 is a transverse sectional view taken along line 3—3 in FIG. 1;

FIG. 4 is an enlarged fragmentary horizontal sectional view taken generally along line 4—4 in FIG. 2;

FIG. 5 is an enlarged fragmentary horizontal sectional view taken generally along 5—5 in FIG. 2;

FIG. 6 is an enlarged fragmentary rear sectional view looking in the direction of arrow 6 in FIG. 1;

FIG. 7 is a diagrammatic illustration of a portion of the orbital drive means of the present invention in several different positions thereof;

FIG. 8 is a diagrammatic illustration of the orbital path of the saw blade in the respective positions illustrated in FIG. 7;

FIG. 9 is an elevational view of one of the parts of the orbital drive means of the present invention;

FIGS. 10 and 11 are exaggerated diagrammatic views illustrating the range of movement of the saw blade carrier of the present invention in the feed direction;

FIG. 12 is a diagrammatic illustration of the orbital path of movement of a single point on a saw blade powered by the orbital drive means of the present invention; and FIG. 13 is a view similar to FIG. 12, but illustrating the orbital path of a prior art mechanism.

DESCRIPTION OF THE PREFERRED EMBODIMENT

With reference to FIG. 1, the preferred embodiment of the present invention is conventional in overall layout, comprising an electric motor 10 (partly shown) disposed within and forming a part of an outer casing 12 in part defining a handle 14 from the lower surface of which projects a motor switch trigger 16. Disposed within the casing is a gear case 18 having a gear case over 20 affixed thereto by means of bolts 21 (FIGS. 2 and 3). The mating surfaces of case 18 and cover 20 are indicated at 22. A conventional shoe 24 is affixed to the bottom of gear case 18 by means of a clamping screw 26 and clamp washer 28 in the usual manner, permitting relative rotational movement between the body of the jig saw and the shoe about a longitudinally extending axis, thereby facilitating the cutting of bevelled edges. Cooling and chip removal are facilitated by means of a fan 30 affixed to shaft 32 of motor 10 operating in cooperation with a fan baffle 34. Motor shaft 32 is journalled in a ball bearing 36 mounted in the rear wall of gear case 18. Power is supplied to the jig saw via the usual power cord 38 passing through a cord protector 40 into casing 12.

Although the above structure is relatively conventional in jig saws of the present type, the saw blade drive mechanism and the orbital drive means of the present invention contain a number of unique features. The saw blade drive mechanism is of the scotch yoke type, comprising a gear 42 having a hub 44 journalled on a shaft 46 rigidly supported in the rear wall of gear case 18, gear 42 being supported by means of needle bearings 48 and in driving engagement with teeth formed on the forward end of motor shaft 32. Hub 44 has an eccentric cylindrical outer surface 50 slidably received with and drivingly engaging a transversely elongated opening 51 in a counterweight 52. As best shown in FIG. 3, counterweight 52 is provided with vertical slots 54 and 56 in which are slidably disposed pins 58 and 60, respectively, affixed to gear case 18, to insure that counterweight 52 moves only in a vertical direction, as illustrated. Rigidly affixed to the forward end of hub 44 by means of screws 62 is a generally circular crank plate 64 having an eccentrically located pin 66 having a roller busing 68 rotationally disposed on the forward end thereof.

Roller housing 68, which serves as a low friction crank pin, is drivingly disposed within an arcuate slot 70 (FIG. 2) of a generally vertically extending saw blade carrier 72 having a transversely extending relatively flat upper section 74 in which slot 70 is disposed and an offset generally parallel and flat lower section 76. Upper section 74 is adapted to slidingly engage a generally flat support surface 78 on the front face of crank plate 64. The transition between upper section 74 and lower section 76 of carrier 72 is defined by a shoulder 80 (FIGS. 1 and 10). A saw blade 86 is affixed to the lower end of blade carrier 72 by means of a blade chuck 82 retained in place by a set screw 84. Slot 70 has a vertical dimension slightly greater than the outside diameter of roller housing 68 in order to accommodate fore-and-aft orbital movement of carrier 72, as shown in an exaggerated manner in FIGS. 10 and 11.

Unique means are provided for guiding the movement of blade carrier 72 to insure that its movement will be limited to reciprocation in a longitudinal plane with a limited degree of orbital movement in the feed direction when desired, but with substantially no rotation about a vertical axis. This guiding is accomplished at the upper end of carrier 72 by the engagement of carrier upper section 74 with support surface 78 and, in addition, by the engagement of the transverse edges of upper section 74 with inwardly directed vertical bearing surfaces 88 of a pair of guide bars 90 mounted in suitably shaped pockets in the front wall of gear case cover 20 in the manner best illustrated in FIGS. 2 and 4. Guide bars 90 also have rearwardly facing bearing surface 92 for the purpose of limiting forward movement of upper section 74 of blade carrier 72. As shown best in FIGS. 1 and 2, the lower end of the blake carrier and saw blade assembly is guided by means of a slotted roller 94 rotationally mounted on a pin 95 carried on a pair of downwardly extending arms 97 forming part of a bell crank 96 pivotally mounted on gear case cover 20 by means of a pin 98. Slotted roller 94 rollingly engages the trailing edge of saw blade 86 in all operative positions thereof. This assembly is constantly biased into engagement with roller 94 and support surface 78 by means of an intermediate guide bearing best illustrated in FIGS. 1, 2 and 5, comprising an H-shaped slide bearing 100 slidably disposed within a sheet metal cage 102 positioned in a suitably shaped opening in a boss 104 formed in the forward wall of gear case cover 20. Slide bearing 100 is mounted for sliding movement in a fore-and-aft direction and is biased in a rearward direction against carrier 72 by means of a compression spring 106 disposed between the forward wall of cage 102 and the opposed surface of slide bearing 100. The lateral sides of cage 102 have inwardly directed flanges 108 at the upper and lower edges thereof FIGS. 2, 4 and 5) to retain slide bearing 100 in a vertical direction. The intermediate guide bearing is retained in place by means of a clamp bracket 110 retained against the rearward face of boss 104 by a threaded fastener 112. In order to provide fore-and-aft orbital movement of the blade carrier adequate clearance is provided between the upper section 74 of carrier 72, support surface 78 and bearing surfaces 92, and an enlarged opening 114 is provided in gear case cover 20. Contaminants are prevented from entering the gear case through opening 114 by means of a laminated rubber and felt seal 116 which sealingly rides on the surface of blade carrier 72.

Because of the improved carrier guide means of the present invention, manufacturing tolerances are less critical and carrier 72 may be inexpensively fine blanked in one piece. This, along with the elimination of the usual upwardly extending stem for upper bearing purposes, significantly reduces the overall weight of the mechanism. In addition, clamp 82 may be relatively low mass because the side of carrier 72 may be used for one of the blade clamping surfaces. Furthermore, the relatively wide face on upper section 74 of carrier 72 reduces unit pressures on the frictional surfaces, thereby reducing overall friction, wear and heat, and increasing efficiency. This wide face (and the attendant large moment arm) also improves blade alignment and provides high resistance to rotation of the blade about a vertical axis.

As can be readily visualized, rotation of motor shaft 32 will impart a vertical oscillatory movement to counterweight 52 and rotation to crank plate 64, and the action of roller bushing 68 engaging the inside peripheral surface of slot 70 will cause vertical reciprocation of blade carrier 72 and saw blade 86 affixed thereto. To effect the desired counterbalancing of the respective parts, counterweight 52 moves 180 degrees out of phase with blade carrier 72, the mechanism shown in FIG. 1 illustrating the crank pin at its top dead-center position and the counterweight at its lowermost position.

Unique means are also provided for controlling the orbital movement of the saw blade, comprising orbital drive means incorporating a fork 118 journalled to gear case 18 by means of a pin 120 supported by a boss 122 formed in the gear case. As best illustrated in FIGS. 1, 3 and 9, fork 118 has a pair of upwardly extending arms 124 and 126 drivingly engaging eccentric hub 44 and a generally transversely extending lower arm 128 having a driving cam surface 130 on the lower surface thereof (for purposes of illustration the longitudinal section of FIG. 1 is taken generally along line X—X in FIG. 3, insofar as fork 118 is concerned). Bell crank 96 contains an upper lever arm 132 which passes through a dust seal 133 into gear case 18, the rearward edge of lever arm 132 defining a driven cam surface 134 in generally opposed relationship to cam surface 130. Motion translating means in the form of a push rod 136 is disposed between and engages cam surfaces 130 and 134 in all operative positions thereof. Push rod 136 is slidably supported within a transverse aperture in a shaft 138 rotationally disposed within a suitably sized opening in the rearward wall of gear case 18. Cam surfaces 130 and 134 are generally circular in configuration and have a common center of curvature coincident with the rotational axis of shaft 138 (in the portion of the stroke shown). Rotation of shaft 138 therefore causes the ends of push rod 136 to traverse cam surfaces 130 and 134 while always remaining in engagement therewith, while push rod 136 moves axially in the transverse aperture in shaft 138. The rearward end of shaft 138 is provided with a manually operable orbit control knob 140 (FIGS. 1 and 6). A spring detent assembly 142 may be provided in knob 140 to cooperate with a plurality of recesses 144 in the outer rear surface of gear case 18 to provide optional predetermined rotational positions of shaft 138, and hence predetermined degrees of orbital movement (from full orbital to straight line). Infinite control within the limits of the mechanism may alternatively be provided by eliminating the detent assembly.

As will be readily visualized, when motor 10 is energized oscillations of hub 44 will cause fork 118 to oscillate about pin 120 to cause arm 128 to oscillate in a generally vertical direction. This movement of arm 128 is transmitted via push rod 136 to lever arm 132 of bell crank 96 to thereby cause roller 94 to move the blade carrier and saw blade assembly in a fore-and-aft direction, thereby providing an orbital movement of the blade when the latter is reciprocating. The geometry of the mechanism is such that roller 94 urges the saw blade in a forward or feed direction when the latter is on its upward sawing stroke and the bias of slide bearing 100 (plus the reaction force exerted by the workpiece resisting movement in the feed direction) moves it in the reverse direction as determined by the progressively rearward position of roller 94 on the downward stroke of the saw blade. At all times the saw blade is under positive guiding and driving control and there is no lost motion (other than normal manufacturing clearances) in either the blade drive mechanism or the orbit drive mechanism.

The range of orbital control provided by the novel mechanism of the present invention is best illustrated in FIGS. 7 and 8. In the upper view in FIG. 7 the mechanism is illustrated in "full orbit" position in which maximum displacement of the saw blade in the fore-and-aft direction will occur. In this position push rod 136 is arranged with its center axis passing a substantial distance from the rotational axis of fork 118 at pin 120. Substantial oscillation is thereby impacted by fork 118 to push rod 136, which in turn transmits such motion to cam surface 134 on bell crank 96 to cause maximum oscillation of roller 94. FIGS. 10 and 11 show in exaggerated form the corresponding range of movement of carrier 72 with respect to support surface 78. Because of the offset in carrier 72 it is free to rock on support surface 78 with either the upper edge thereof or shoulder 80 thereof engaging surface 78, which in conjunction with guide bars 90 fully guides the upper end of the carrier. The bias of intermediate guide bearing 100 maintains carrier 72 in engagement with support surface 78 and the blade in engagement with guide roller 94. This overall arrangement eliminates the need for the usual upwardly extending stem on the carrier for support by an upper bearing, thereby providing a significant weight reduction.

In the lower view in FIG. 7 shaft 138 has been rotated to move push rod 136 so that its center axis is in line with the pivotal axis of fork 118. In this position, oscillation of fork 118 will impart no movement to push rod 136. Roller 94 consequently will not oscillate and the saw blade will reciprocate on a straight line path. The intermediate views in FIG. 7 illustrate intermediate orbital positions of the mechanism, and as can be readily visualized provide intermediate degrees or orbital movement. The orbital path defined by a single point on the saw blade during a complete cycle for each such position thereof is generally illustrated in FIG. 8, with each of the views thereof being aligned with the corresponding orbital position in FIG. 7.

The best overall view of applicant's orbital path is formed in FIG. 12, wherein three degrees or orbital movement are shown. The vertical axis of the jig saw (as shown in its horizontal position) is indicated at a, and it is along this axis that the saw blade reciprocates when in its non-orbiting or straight line position. The outer contour (solid line) illustrates the orbital path of the saw blade when in the full orbital position, and the intermediate dashed lines illustrate intermediate orbital positions. As can be seen, all orbital paths are generally continuous and uninterrupted. Because of the pendular movement of the saw blade carrier there is greater fore-and-aft displacement of the saw blade at the lower portion of its path than there is at the upper portion thereof. Furthermore, the orbital drive mechanism is arranged to provide a forward motion of the saw blade for the major part of its upward cutting stroke. As can be seen, the orbital saw blade path is contoured so that the saw blade is moving forward (i.e., in the feed direction) from the bottom of its path up to point e, which is approximately 70% of its total stroke. This is achieved by canting fork 118 (FIG. 9). If fork 118 was formed without a cant, the orbital path would be truly symmetrical about axis a; however, by providing a cant, such as indicated by angle k in FIG. 9, the orbital drive means is "phased" so that the orbital path is distorted in the manner shown in FIG. 12 to provide forward blade movement for a greater portion of the cutting stroke. Axis c in FIG. 12 is canted with respect to axis a by an amount equal to angle d, which represents the phase shift caused by the cant of fork 118. Accordingly, the point of intersection of axis c and the full orbital path, indicated at e, is the maximum forward position of the saw blade in a given cycle. Conversely, point f is the most rearward point of the saw blade movement on its return stroke. The intersection of any intermediate orbital path of the saw blade with axis c represents the maximum displacement position of the saw blade (with respect to axis a) for that degree of orbital movement. It is significant that the saw blade moves rearwardly of axis a on its return stroke (and in a rearward direction for the major portion of such stroke) because this action facilitates the release of wood chips, etc. from the saw blade. The smooth, uninterrupted orbital movement of applicant's saw blade may be contrasted with that of a typical prior art lost motion type mechanism, such as shown in FIG. 13. Note that the full orbit path, indicated at i is displaced wholly on one side of the straight line path which occurs along axis h, thus impairing wood chip removal; and that a partial orbit path, such as indicated at j, is not smooth and interrupted but has a distinct "bump" in it which will cause the saw blade to impact the workpiece.

Unlike many prior designs, the present mechanism obtains an adjustable degree of orbital movement without introducing lost motion into the system; the present mechanism varies the orbit by changing the mechanical advantage of the system, not by interrupting movement. Another significant advantage of the present invention is that the orbital movement of the blade, regardless of the degrees thereof, is always disposed on opposite sides of the straight line path thereof (i.e., the non-orbital path) on its cutting and return strokes, respectively. This is very desirable because it maximizes use of all the teeth of the saw blade throughout most of its cutting stroke, as distinguished from many known mechanisms which merely interrupt the orbital path of the saw blade to reduce the degree of orbital movement, and because it facilitates chip removal.

Thus, there is disclosed in the above description and in the drawings an improved orbital jig saw which fully and effectively accomplishes the objectives thereof. However, it will be apparent that variations and modifications of the disclosed embodiment may be made without departing from the principles of the invention or the scope of the appended claims.

I claim:

1. An orbit adjusting mechanism for an orbital jig saw having a casing containing a motor driven reciprocal saw blade carrier and oscillating orbital drive means, and a movable saw blade guide supported by the causing and positioned to engage the trailing edge of a reciprocating saw blade carried by the saw blade carrier, said mechanism comprising:

a level supported by said casing for pivotal movement about a first axis, said lever being operatively connected to said orbital drive means so that the latter causes said lever to oscillate about said first axis;

motion translating means movably supported by said casing, said motion translating means engaging said oscillating lever in all operative positions thereof and coacting with said saw blade guide, whereby motion of said oscillating lever is transmitted to said saw blade guide; and orbit adjusting means for moving said motion translating means with respect to said oscillating lever from a first position in which said motion translating means engages said lever at a first point aligned with said first axis, wherein no motion is transmitted to said motion translating means by said oscillating lever, to a second position in which said motion translating means engages said lever at a second point space from said first point, wherein substantial motion is transmitted to said motion translating means and hence said saw blade guide by said oscillating lever.

2. The assembly of claim 1, wherein said motion translating means moves axially in response to motion of said oscillating lever, the axis of said axial movement intersecting said first axis when said motion translating means is in said first position.

3. The assembly of claim 1, wherein said lever has a cam surface thereon, said first point lying on a portion of said cam surface which is substantially normal to a line passing through said first axis.

4. The assembly of claim 1, wherein said motion translating means continuously engages said lever with no substantial lost motion between the motion of said orbital drive means and said saw blade guide in all operating positions thereof.

5. The assembly of claim 1, wherein said saw blade moves in an orbital path when said motion translating means is in said second position which is symmetrical with respect to the path of said saw blade when said motion translating means is in said second position.

6. The assembly of claim 1, wherein said motion translating means includes a push rod engaging said lever, said push rod being movable along its own axis in response to motion of said lever.

7. The assembly of claim 1, wherein said motion translating means includes a push rod engaging said lever, said push rod being pivotal about an axis transverse thereto in response to actuation by said orbit adjusting means.

8. The assembly of claim 1, wherein said motion translating means includes a push rod engaging said lever, said push rod being movable along its own axis in response to motion of said lever and being pivotal about a transverse axis in response to actuation by said orbit adjusting means.

9. The assembly of claim 1, wherein said lever has a cam surface thereon and said motion translating means engages said cam surface.

10. The assembly of claim 9, wherein said cam surface is circular in configuration.

11. The assembly of claim 10, wherein said motion translating means includes a push rod engaging said lever, said push rod being pivotal about the axis of curvature of said cam surface in response to actuation by said orbit adjusting means.

12. The assembly of claim 11, wherein said push rod moves along its own axis in response to motion of said lever.

13. An orbit adjusting mechanism for an orbital jig saw having a casing containing a motor driven reciprocal saw blade carrier and oscillating orbital drive means, and a saw blade guide supported by the casing and positioned to engage the trailing edge of a reciprocating saw blade carried by the saw blade carrier, said mechanism comprising:

oscillating means in said casing defining a driving cam surface, said oscillating means being operatively connected to said orbital drive means so that oscillations of the latter are transmitted thereto, said driving cam surface being contoured so that the oscillational displacement thereof at a first point thereon is substantially zero and at a second point thereon is of substantial magnitude;

a lever mounted for oscillating movement on said casing, said lever being connected to and supporting said saw blade guide, whereby oscillating pivotal movement of said lever will cause said saw blade guide to move a reciprocating saw blade engaged thereby in an orbital path, said lever having a driven cam surface thereon;

motion translating means extending between and engaging both said sam surfaces in all operable positions thereof for transmitting movement of said driving cam surface to said driven cam surface; and adjusting means for moving said motion translating means from a first position in which it engages said driving cam surface at said first point,
   wherein substantially no oscillating movement is transmitted to the reciprocating blade guide, to a second position in which it engages said driving cam surface at said second point,
   wherein said substantial oscillational displacement of said driving cam surface is transmitted to said driven cam surface and hence to the saw blade via said lever, whereby the reciprocating saw blade is caused to move in an orbital path.

14. The assembly of claim 13, wherein said mechanism causes said saw blade to move in an orbital path when said motion translating means is in said second position, which is symmetrical about the straight line path of said saw blade when said motion translating means is in said first position.

15. The assembly of claim 13, wherein oscillations of said orbital drive means are transmitted into orbital movement of the saw blade without significant lost motion at all times during orbital operation.

16. The assembly of claim 13, wherein said cam surfaces face one another and are complementary in contour, said motion translating means being disposed therebetween.

17. The assembly of claim 16, wherein said cam surfaces are circular, having a common center axis of curvature.

18. The assembly of claim 17, wherein said motion translating means is rotatable about said center axis between said first and second positions thereof.

19. An orbit adjusting mechanism for an orbital jig saw having a casing containing a motor driven reciprocal saw blade carrier and motor driven oscillating orbital drive means and a movable saw blade guide positioned to engage the trailing edge of a reciprocating saw blade carried by the saw blade carrier, said mechanism comprising:

a lever mounted in said casing for rotational oscillation about a first axis, said lever being operatively connected to said orbital drive means so that oscillations of the latter are transmitted to said lever;

a generally circular driving cam surface on said lever having a center of curvature lying on a second axis spaced from and parallel to said first axis;

a crank having first and second arms and mounted for pivotal movement on said casing, said first arm being connected to and supporting said saw blade guide whereby oscillating pivotal movement of said crank will cause said saw blade guide to move a reciprocating saw blade engaged thereby in an orbital path;

a generally circular driven cam surface on said second arm having a center of curvature lying on said second axis, said first and second cam surfaces generally facing one another;

a push rod extending between and engaging both said cam surfaces for transmitting movement of said driving cam surface to said driven cam surface, said push rod being supported on said casing for rotation about said second axis and radial movement through said second axis; and manually operable adjusting means for rotating said push rod from a first position in which it engages said driving cam surface at a first point lying in a plane defined by said first and second axes, wherein no oscillating movement is transmitted to the reciprocating blade guide, to a position in which it engages said first cam surface at a second point displaced from said first point, wherein oscillating movement of said driving cam surface is transmitted to said second cam surface and hence to the saw blade via said crank, whereby the reciprocating saw blade is caused to move in an orbital path.

20. The assembly of claim 19, wherein said push rod engages both said cam surfaces in all operating positions thereof and oscillations of said orbital drive means are transmitted into orbital movement of the saw blade without significant lost motion at all times during orbital operation.

21. The assembly of claim 19, wherein one of said cam surfaces has a radius of curvature less than that of the other said cam surface.

22. The assembly of claim 21, wherein said driving cam surface has the greater radius of curvature.

23. The assembly of claim 19, wherein the pivotal axis of said crank is disposed at right angles to the said first and second axes.

24. An orbit adjusting mechanism for an orbital jig saw having a casing containing a motor driven reciprocal saw blade carrier and oscillating orbital drive means, and a movable saw blade guide supported by the casing and positioned to engage the trailing edge of a reciprocating saw blade carried by the saw blade carrier, said mechanism comprising:

a lever supported by said casing for pivotal movement about a first axis, said lever being operatively connected to said orbital drive means so that the latter causes said lever to oscillate about said first axis;

motion translating means movably supported by said casing, said motion translating means engaging said oscillating lever and being connected to said saw blade guide, whereby motion of said oscillating lever is transmitted to said saw blade guide; and orbit adjusting means for moving said motion translating means with respect to said oscillating lever from a first position in which said motion translating means engages said lever at a first point aligned with said first axis, wherein no motion is transmitted to said motion translating means by said oscillating lever and hence said saw blade reciprocates in a straight line path, to a second position in which said motion translating means engages said lever at a second point spaced from said first point, wherein substantial motion is transmitted to said motion translating means and hence to said saw blade guide by said oscillating lever to thereby cause said saw blade to reciprocate in an orbital path symmetrical about said straight line path.

25. An orbit adjusting mechanism for an orbital jig saw having a casing containing a motor driven reciprocal saw blade carrier and oscillating orbital drive means, and a movable saw blade guide supported by the casing and positioned to engage the trailing edge of a reciprocating saw blade carried by the saw blade carrier, said mechanism comprising:

a lever movably supported by said casing, said lever having a cam surface thereon and being operatively connected to said orbital drive means so that the latter causes said lever to oscillate, said cam surface being contoured so that the oscillational displacement thereof responsive to shifting of said orbital drive means at a first point thereon is substantially zero and at a second point thereon is of substantial magnitude;

motion translating means movably supported by said casing, said motion translating means engaging said cam surface in all operative positions thereof and being connected to said saw blade guide, whereby motion of said oscillating lever is transmitted to said saw blade guide; and orbit adjusting means for moving said motion translating means with respect to said cam surface from said first point, wherein no motion is transmitted to said motion translating means by said oscillating lever, to said second point, wherein substantial motion is transmitted to said motion translating means and hence said saw blade guide by said oscillating lever.

* * * * *